United States Patent
Tong et al.

(10) Patent No.: US 12,200,396 B2
(45) Date of Patent: Jan. 14, 2025

(54) METHOD FOR ASYNCHRONOUSLY STORING MASSIVE DATA GENERATED DURING HIGH SPEED VIDEO MEASUREMENT

(71) Applicant: TONGJI UNIVERSITY, Shanghai (CN)

(72) Inventors: Xiaohua Tong, Shanghai (CN); Peng Chen, Shanghai (CN); Huanping Ma, Shanghai (CN); Huan Xie, Shanghai (CN); Yongjiu Feng, Shanghai (CN); Shijie Liu, Shanghai (CN); Yanmin Jin, Shanghai (CN); Xiong Xu, Shanghai (CN); Sicong Liu, Shanghai (CN); Zhen Ye, Shanghai (CN); Chao Wang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 401 days.

(21) Appl. No.: 17/728,960

(22) Filed: Apr. 25, 2022

(65) Prior Publication Data

US 2023/0007212 A1    Jan. 5, 2023

(30) Foreign Application Priority Data

Jun. 30, 2021    (CN) .......................... 202110731783.0

(51) Int. Cl.
| | |
|---|---|
| *H04N 5/907* | (2006.01) |
| *H04N 5/77* | (2006.01) |
| *H04N 25/71* | (2023.01) |

(52) U.S. Cl.
CPC ............... *H04N 5/907* (2013.01); *H04N 5/77* (2013.01); *H04N 25/71* (2023.01)

(58) Field of Classification Search
USPC ......................................................... 348/135
See application file for complete search history.

(56) References Cited

U.S. PATENT DOCUMENTS

| | | | | |
|---|---|---|---|---|
| 7,529,834 | B1 * | 5/2009 | Birrell ................. | G06F 11/1464 709/227 |
| 9,379,109 | B1 * | 6/2016 | Karp ........................ | G11C 8/16 |
| 11,030,814 | B1 * | 6/2021 | Kwiatkowski ........ | G06T 19/006 |
| 11,103,207 | B1 * | 8/2021 | Singh ..................... | H01J 35/025 |
| 11,477,411 | B1 * | 10/2022 | Harfouche ........... | H04N 23/698 |
| 2002/0080881 | A1 * | 6/2002 | Honda ................. | H04N 19/132 375/E7.254 |
| 2002/0154330 | A1 * | 10/2002 | Carlton ..................... | G06T 9/00 358/1.15 |
| 2003/0222982 | A1 * | 12/2003 | Hamdan ................ | H04N 7/181 348/148 |

(Continued)

*Primary Examiner* — Nigar Chowdhury
(74) *Attorney, Agent, or Firm* — JCIP GLOBAL INC.

(57) ABSTRACT

The present invention relates to a method for asynchronously storing massive data generated during high speed video measurement, the method including the following steps: step (1), constructing a high speed video measurement hardware model; and step (2) realizing asynchronous I/O real-time storage in a high speed solid state disk on the basis of Windows core programming. Compared with the prior art, the present invention solves the problems of incompleteness or frame drop during real-time storage of massive data, and realizes real-time and lossless storage of massive high speed data.

8 Claims, 2 Drawing Sheets

(56) References Cited

U.S. PATENT DOCUMENTS

| | | | | |
|---|---|---|---|---|
| 2010/0138887 | A1* | 6/2010 | Nakata | H04N 21/4325 |
| | | | | 348/738 |
| 2010/0269137 | A1* | 10/2010 | Nakajima | H04N 1/00299 |
| | | | | 725/39 |
| 2011/0182216 | A1* | 7/2011 | Ono | H04L 5/16 |
| | | | | 370/282 |
| 2013/0028528 | A1* | 1/2013 | Arai | H04N 19/59 |
| | | | | 382/233 |
| 2013/0272680 | A1* | 10/2013 | Lu | H04N 21/854 |
| | | | | 386/285 |
| 2015/0200996 | A1* | 7/2015 | Ziarati | H04L 12/2838 |
| | | | | 709/201 |
| 2015/0357369 | A1* | 12/2015 | Kobayashi | H04N 25/60 |
| | | | | 250/208.1 |
| 2016/0307335 | A1* | 10/2016 | Perry | H04N 23/90 |
| 2017/0003271 | A1* | 1/2017 | Nadkarmi | G01N 21/21 |
| 2017/0219468 | A1* | 8/2017 | Peterson | H04N 7/10 |
| 2018/0197014 | A1* | 7/2018 | Barrs, II | G06V 20/49 |
| 2018/0336339 | A1* | 11/2018 | Wang | G06F 21/46 |
| 2019/0028776 | A1* | 1/2019 | Arai | H04N 21/234381 |
| 2019/0302858 | A1* | 10/2019 | Ali | G06F 1/186 |
| 2019/0388729 | A1* | 12/2019 | Shimizu | A63B 69/3658 |
| 2020/0005425 | A1* | 1/2020 | Nakazono | H04N 23/60 |
| 2020/0043440 | A1* | 2/2020 | Qiu | G06F 30/30 |
| 2020/0180759 | A1* | 6/2020 | Harada | G05D 1/0094 |
| 2020/0221056 | A1* | 7/2020 | Cao | H04N 1/32101 |
| 2020/0406463 | A1* | 12/2020 | Namiki | G06F 3/0655 |
| 2021/0064240 | A1* | 3/2021 | Kao | G06F 3/0689 |
| 2021/0090270 | A1* | 3/2021 | Jiang | G01F 1/712 |
| 2021/0187358 | A1* | 6/2021 | Shinohara | A63B 37/00222 |
| 2021/0239564 | A1* | 8/2021 | Ma | G01P 5/00 |
| 2021/0255979 | A1* | 8/2021 | Colenbrander | H04L 49/351 |
| 2021/0354144 | A1* | 11/2021 | Sheng | B01L 3/502715 |
| 2023/0260552 | A1* | 8/2023 | Bose | H04N 7/188 |
| | | | | 463/31 |

* cited by examiner

METHOD FOR ASYNCHRONOUSLY STORING MASSIVE DATA GENERATED DURING HIGH SPEED VIDEO MEASUREMENT

CROSS-REFERENCE TO RELATED APPLICATION

This application claims the priority benefit of China application serial no. 202110731783.0, filed on Jun. 30, 2021. The entirety of the above-mentioned patent application is hereby incorporated by reference herein and made a part of this specification.

BACKGROUND

Technical Field

The present invention relates to the technical field of high speed video storage, and more particularly to a method for asynchronously storing massive data generated during high speed video measurement.

Description of Related Art

A high speed video measurement system can acquire hundreds of or thousands of high resolution images in seconds, can instantaneously record the spatial position and state of an object moving at a high speed, and is therefore widely used in the field of engineering measurement. Massive data are necessarily generated when a high speed camera with a high resolution and a high frame frequency is used to persistently measure an object moving at a high speed. If the data storage speed does not match the transmission speed of the high resolution and high frame frequency data, the recorded data of a high speed video will be incomplete or have frames dropped. A mechanical hard disk is generally not suitable for high speed real-time massive data storage due to the poor performance thereof. How to improve the real-time massive data storage speed during high speed video measurement is a problem which is urgent to be solved in the field of high speed video measurement. In the research direction of high speed video storage, numerous scholars put forward solutions to the problem. The solutions can be summarized as follows: (1) an NAND FLASH storage medium based on FPGA; (2) a solid state disk based on an FPGA controlled SATA interface; (3) a solid state disk based on PowerPC and a SATA interface; (4) a storage medium based on FPGA and DDR3-SDRAM; (5) a solid state disk based on PowerPC, FPGA and SATA; (6) the data storage rate is improved on the basis of an SATA interface and a plurality of NAND flashes by combining PowerPC with FPGA and by realizing command queue optimization and data parallel transmission based on a kernel and the like.

However, the solution using NAND FLASH as a storage medium is complex to consider, and the design is not easy to realize. Therefore, the solution is difficult to be applied to practical industrial measurement. The solution using DDR3-SDRAM as a storage medium has a high cost, and the stored data is volatile. With regard to the solution using the SATA interface solid state disk as a storage medium, the maximum read/write rate of the SATA interface is limited; therefore, although the solution realizes queue command data parallel transmission on the basis of the kernel and indeed can improve the data storage rate, the solution is difficult to be applied to the real-time and lossless storage of massive data.

SUMMARY

The objective of the present invention is to overcome the defects of the prior art and provide a method for asynchronously storing massive data generated during high speed video measurement which realizes real-time and lossless storage of massive high speed data.

The objective of the present invention can be realized by the following technical solution.

According to one aspect of the present invention, a method for asynchronously storing massive data generated during high speed video measurement is provided, the method including the following steps:
  step (1), constructing a high speed video measurement hardware model; and
  step (2) realizing asynchronous I/O real-time storage in a high speed solid state disk on the basis of Windows core programming.

As a preferred technical solution, the step (1) constructing a high speed video measurement hardware model specifically is as follows:
  step 101, constructing an analog data source hardware module;
  step 102, constructing a high speed transmission hardware module; and
  step 103, constructing a high speed storage hardware module.

As a preferred technical solution, the step 101 specifically is as follows:
  using a CMOS high speed camera as an analog data source, wherein the resolution of the COMS high speed camera is 2048×2000, the acquisition frame frequency of the COMS high speed camera is 500 fps, and the image bit depth of the COMS high speed camera is 8 bits.

As a preferred technical solution, the step 102 specifically is:
  using two optical fiber mediums to connect a CMOS high speed camera data simulator and a high speed image acquisition card, and using a Camera Link HS interface as a data transmission interface.

As a preferred technical solution, the step 103 specifically is as follows: using an M.2 type NVMe protocol high speed solid state disk as a storage medium, wherein the storage medium can adopt a memory array form.

As a preferred technical solution, the step (2) specifically includes:
  step 201, asynchronous I/O preprocessing process;
  step 202, cyclic asynchronous I/O processing process of massive data; and
  step 203, asynchronous I/O stopping-storing processing process.

As a preferred technical solution, the step 201 specifically includes the following steps:
  step 2011, providing an absolute path of a file to be stored;
  step 2012, connecting a corresponding device by using the absolute path of the file to be stored as a parameter;
  step 2013, creating an I/O completion port, and binding the I/O completion port to a started device;
  step 2014, pre-sending a write command with four null bytes;
  step 2015, setting to start to store data; and
  step 2016, starting up a thread to prepare for the cyclic asynchronous I/O process of the massive data.

As a preferred technical solution, the step 202 specifically includes the following steps:
 step 2021, first checking whether to start to store data; if not, then directly ending the processing process, otherwise executing step 2022;
 step 2022, checking an I/O completed queue;
 step 2023, determining whether the write command is completed; if not, then continuously checking the I/O completed queue, otherwise executing step 2024;
 step 2024, reading a data block from a buffer pool; and
 step 2025, sending a write-in-device command, and updating a written offset value.

As a preferred technical solution, the data block in the step 2024 is in a size of a single frame image.

As a preferred technical solution, the step 203 specifically includes the following steps:
 step 2031, determining whether stopping-storing is triggered; if so, then executing step 2032;
 step 2032, starting up a thread;
 step 2033, checking whether preset time is consistent with storage time; if so, then executing step 2035, otherwise executing step 2034;
 step 2034, continuously waiting until the storage time is consistent with the preset time, and then executing step 2035; and
 step 2035, directly setting to stop storing.

Compared with the prior art, the present invention has the following advantages.
 1) The present invention solves the problems of incompleteness or frame drop during real-time storage of massive data, and realizes real-time and lossless storage of massive high speed data;
 2) The present invention has a high stability and reliability, uses two optical fiber transmission mediums to connect the high speed camera analog data source and the high speed image acquisition card, and uses two Camera Link HS data transmission interfaces; the maximum data transmission rate is 2.5 GB/s; the solid state disk uses the Samsung 970 Pro 512 GB M.2 type NVMe protocol; the asynchronous I/O storage of the solid state disk is developed on the basis of Windows core programming, and the highest real-time storage speed can reach 2.0 GB/s.

DESCRIPTION OF THE EMBODIMENTS

The technical solutions in the embodiments of the present invention will be clearly and completely described hereafter with reference to the drawings in the embodiments of the present invention. It is apparent that the described embodiments are a part of the embodiments of the present invention, but not the whole. On the basis of the embodiments in the present invention, all the other embodiments obtained by a person skilled in the art without involving an inventive effort should be all concluded in the protection scope of the present invention.

It is a technical problem that the stored data of a high speed video measurement system will be incomplete or have frames dropped if the storage speed of a high speed video does not match the transmission speed of a high resolution and high frame frequency data source. Massive data is at least in units of GB. The speed of a SATA interface solid state disk, as a storage medium, is limited to hundreds of megabytes per second which is difficult to satisfy a requirement for high speed video measurement. In order to overcome the problem, the present invention provides a method for asynchronously storing massive data generated during high speed video measurement, the method mainly consisting of the following steps: (1) constructing a high speed storage hardware environment, specifically: using two optical fiber mediums to connect a CMOS high speed camera data simulator and a high speed image acquisition card; using a Camera Link HS interface as a data transmission interface; using an M.2 type NVMe protocol high speed solid state disk as a storage medium; and (2) realizing asynchronous I/O real-time storage in a high speed solid state disk on the basis of Windows core programming. The experiment verifies a 2 GB/s data source; the write speed of the solid state disk is about 2.0 GB/s, and can perform real-time and lossless high speed video measurement for a long time.

1. Hardware Environment of the Method for Asynchronously Storing Massive Data

Figure 1:
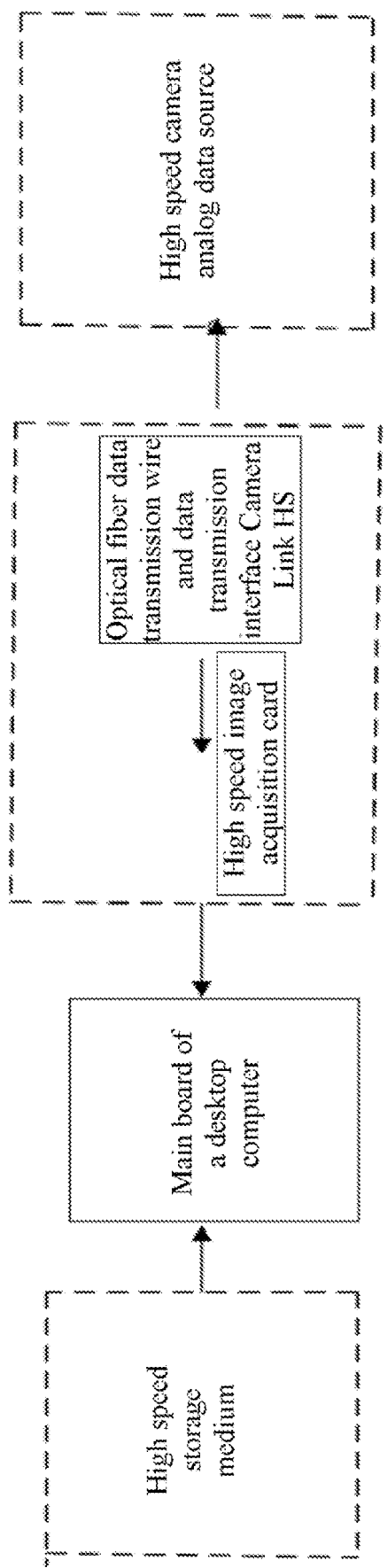
FIG. 1 is a schematic view of hardware according to the present invention.

A high speed video measurement hardware model is constructed as shown in FIG. 1. The model consists of the following hardware modules: (1) an analog data source hardware module. A CMOS high speed camera is used an analog data source, wherein the resolution of the COMS high speed camera is 2048×2000, the acquisition frame frequency of the COMS high speed camera is 500 fps, and the image bit depth of the COMS high speed camera is 8 bits. (2) A high speed transmission hardware module. Two optical fiber transmission mediums are used; the data transmission interface uses the Camera Link HS interface; and the total transmission speed is 2.5 GB/s. The optical fiber high speed transmission mediums are connected to the high speed camera analog data source and the high speed image acquisition card. The high speed image acquisition card is mounted on a Dell commercial desktop computer PCIe3.0× 16 interface. (3) A high speed storage hardware module. The M.2 type NVMe protocol high speed solid state disk Samsung 970 Pro 512 GB is used as a high speed storage medium; and the solid state disk is mounted on a Dell OptiPlex7040 commercial desktop computer M.2 interface.

2. Massive Data High Speed Storage Method Based on an Asynchronous I/O Method

An asynchronous I/O implementation process of the massive data is realized by means of the following modules: (1) an asynchronous I/O preprocessing module; (2) a massive data cyclic asynchronous I/O module; and (3) an asynchronous I/O stopping-storing module. The specific process is as shown in FIG. 2.

Figure 2:
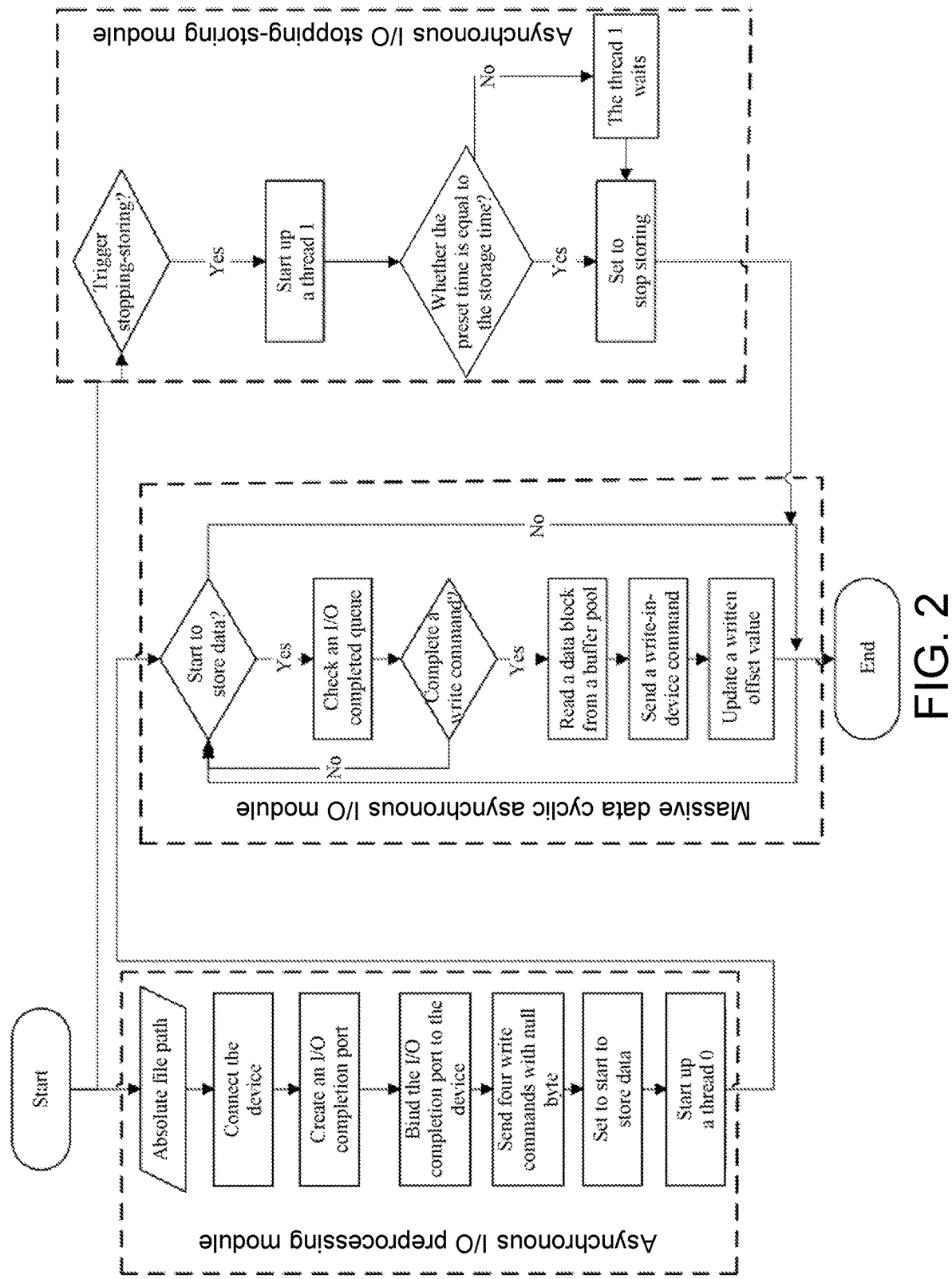
FIG. 2 is a flow chart of a method according to the present invention.

As shown in FIG. 2, the asynchronous I/O implementation process is realized by the asynchronous I/O preprocessing module: providing an absolute path of a file to be stored; using the absolute path of the file as a parameter; starting a corresponding device and setting the storage mode of the device as direct storage and asynchronous storage simultaneously; creating an I/O completion port, and binding the I/O completion port to the started device; pre-sending a write command with four null bytes; setting to start to store data; and starting up a thread to prepare for the cyclic asynchronous I/O process of the massive data.

In the massive data cyclic asynchronous I/O module, first checking whether to start to store data; if not, then directly ending the processing process, otherwise checking an I/O completed queue; if no write command is completed, then continuously checking the I/O completed queue, otherwise reading a data block from a buffer pool, wherein the data block is in a size of a single frame image; and sending a write-in-device command, and updating a written offset value. If the real-time asynchronous I/O process needs to stop, then a stopping-storing thread is triggered.

In the asynchronous I/O stopping-storing module, if stopping-storing is triggered, then starting up a thread; checking whether preset time is consistent with storage time, wherein the preset time is storage time pre-determined by a user; if inconsistent, then continuously waiting until the storage time is consistent with the preset time, and then setting the stopping-storing command to be effective for the massive data cyclic asynchronous I/O module; otherwise directly setting the stopping-storing command to be effective for the massive data cyclic asynchronous I/O module.

Experiment and Result Analysis

In order to verify the stability and reliability of the method for asynchronously storing massive data generated during high speed video measurement, a camera simulator the real-time transmission speed of which is 2.0 GB/s is designed for a storage experiment of real-time massive data generated during high speed video measurement; during the experiment, the real-time storage speed of the solid state disk is 2.0 GB/s.

1. Experiment Implementation Flow

In the experiment, first the hardware modules are connected to construct a hardware environment. An Samsung 970 Pro 512 GB high speed solid state disk is mounted on a Dell OptiPlex 7040 commercial desktop computer M.2 interface; the maximum write speed of the solid state disk is 2.3 GB/s. A Teledyne DALSA high speed image acquisition card is mounted on a Dell OptiPlex 7040 commercial desktop computer PCIe3.0×16 interface. An ALINX FPGA development board is used to simulate the CMOS high speed camera data source. Two optical fiber mediums are used, wherein the transmission speed of each one is 1.25 GB/s; a high speed data interface Camera Link HS is connected to the CMOS high speed camera analog data source and the high speed image acquisition card.

After the hardware environment is constructed, an acquisition and control system of high speed video measurement software is started. The software system sets the volume of the buffer pool as 5000×2048×2000 B, namely about 20 GB, sets the size of the block written in the device as 2048×2000B, and sets the depth of a read-write queue as 4. The software control system controls the acquisition card to start acquisition; the acquired data is transmitted to the buffer pool of an internal memory in real time; the system controls the solid state disk to start to store data. Please see FIG. 2 for specific asynchronous I/O implementation process of the massive data.

2. Experimental Result Analysis

As shown in table 1, the acquisition interval is about 10 s; totally 12 groups of data are stored in real time; and the maximum time is 120.297 s.

TABLE 1

| No. | Record time/ms | Data volume | Number of image frames | Average write speed GB/s |
|---|---|---|---|---|
| 1 | 10562 | 24,268,800,000 | 5925 | 2.1 |
| 2 | 20797 | 43,069,440,000 | 10515 | 1.9 |
| 3 | 30344 | 61,636,608,000 | 15048 | 1.9 |

TABLE 1-continued

| No. | Record time/ms | Data volume | Number of image frames | Average write speed GB/s |
|---|---|---|---|---|
| 4 | 40312 | 79,798,272,000 | 19482 | 1.8 |
| 5 | 50281 | 99,028,992,000 | 24177 | 1.8 |
| 6 | 60313 | 132,214,784,000 | 32279 | 2.0 |
| 7 | 70938 | 150,085,632,000 | 36642 | 2.0 |
| 8 | 80140 | 167,288,832,000 | 40842 | 1.9 |
| 9 | 90156 | 187,183,104,000 | 45699 | 1.9 |
| 10 | 100250 | 205,926,400,000 | 50275 | 1.9 |
| 11 | 110187 | 232,022,016,000 | 56646 | 2.0 |
| 12 | 120297 | 247,779,328,000 | 60493 | 1.9 |

In table 1, the number of image frames is acquired according to the data volume and the size of the last frame of image (2048×2000 B). The average write speed of each group is calculated according to the written data volume and the record time.

During experiment, the method for asynchronously storing massive data can store in real time, at a maximum 2.0 GB/s write speed, the data transmitted from the CMOS high speed camera analog data source at a transmission speed about 2.0 GB/s.

The present invention provides a stable and reliable method for asynchronously storing massive data generated during high speed video measurement to solve the problems of incompleteness or frame drop during real-time storage of massive data. The hardware environment is constructed to design and realize the method for asynchronously storing massive data generated during high speed video measurement. In the designed experiment, the data transmitted from the CMOS high speed camera analog data source at a real-time transmission speed about 2.0 GB/s can be losslessly stored in real time at the speed about 2.0 GB/s with the method for asynchronously storing massive data generated during high speed video measurement. If more massive data are acquired from a high speed video, the present method is still applicable as long as a solid state disk with a wider bandwidth and a greater volume is used.

The descriptions above are only preferred embodiments of the present invention. However, the protection scope of the present invention is not limited to the embodiments; any person skilled in the art can easily conceive of various equivalent modifications or substitutions in the technical scope disclosed by the present invention; and these modifications or substitutions shall be all concluded in the protection scope of the present invention. Therefore, the protection scope the claims shall prevail as the protection scope of the present invention.

What is claimed is:

1. A method for asynchronously storing massive data generated during high speed video measurement, comprising the following steps:
   step (1), constructing a high speed video measurement hardware model; and
   step (2) realizing asynchronous I/O real-time storage in a high speed solid state disk on a basis of Windows core programming,
   wherein the step (2) comprises:
   step 201, asynchronous I/O preprocessing process, comprising: step 2011, providing an absolute path of a file to be stored; connecting a corresponding device by using the absolute path of the file to be stored as a parameter; creating an I/O completion port, and binding the I/O completion port to a started device; presending a write command with four null bytes; setting to start to store data; and starting up a thread to prepare for the cyclic asynchronous I/O process of the massive data;

step 202, cyclic asynchronous I/O processing process of massive data; and step 203, asynchronous I/O stopping-storing processing process.

2. The method for asynchronously storing massive data generated during high speed video measurement according to claim 1, wherein the step (1) constructing the high speed video measurement hardware model specifically is as follows:

step 101, constructing an analog data source hardware module;

step 102, constructing a high speed transmission hardware module; and step 103, constructing a high speed storage hardware module.

3. The method for asynchronously storing massive data generated during high speed video measurement according to claim 2, wherein the step 101 specifically is as follows:

using a complementary metal-oxide-semiconductor (CMOS) high speed camera as an analog data source, wherein a resolution of the COMS high speed camera is 2048×2000, an acquisition frame frequency of the COMS high speed camera is 500 fps, and an image bit depth of the COMS high speed camera is 8 bits.

4. The method for asynchronously storing massive data generated during high speed video measurement according to claim 2, wherein the step 102 specifically is as follows:

using two optical fiber mediums to connect a CMOS high speed camera data simulator and a high speed image acquisition card, and using a Camera Link HS interface as a data transmission interface.

5. The method for asynchronously storing massive data generated during high speed video measurement according to claim 2, wherein the step 103 specifically is as follows:
using an M.2 type NVMe (non-volatile memory express) protocol high speed solid state disk as a storage medium, wherein the storage medium adopt a memory array form.

6. The method for asynchronously storing massive data generated during high speed video measurement according to claim 1, wherein the step 202 specifically comprises the following steps:

step 2021, first checking whether to start to store data; if not, then directly ending the processing process, otherwise executing step 2022;

step 2022, checking an I/O completed queue;

step 2023, determining whether a write command is completed; if not, then continuously checking the I/O completed queue, otherwise executing step 2024;

step 2024, reading a data block from a buffer pool; and step 2025, sending a write-in-device command, and updating a written offset value.

7. The method for asynchronously storing massive data generated during high speed video measurement according to claim 6, wherein the data block in the step 2024 is in a size of a single frame image.

8. The method for asynchronously storing massive data generated during high speed video measurement according to claim 1, wherein the step 203 specifically comprises the following steps:

step 2031, determining whether stopping-storing is triggered; if the stopping-storing is triggered, executing step 2032;

step 2032, starting up a thread;

step 2033, checking whether preset time is consistent with storage time; if the preset time is consistent with the storage time, executing step 2035; if the preset time is not consistent with the storage time, executing step 2034;

step 2034, continuously waiting until the storage time is consistent with the preset time, and then executing step 2035; and step 2035, directly setting to stop storing.

* * * * *